July 19, 1955

L. A. McNABB 2,713,618

POCKET RECORDER

Filed Dec. 7, 1949

INVENTOR.
Louis A. McNabb
BY
Thiess, Olson & Mecklenburger
att'ys

July 19, 1955
L. A. McNABB
2,713,618
POCKET RECORDER
Filed Dec. 7, 1949
7 Sheets-Sheet 2
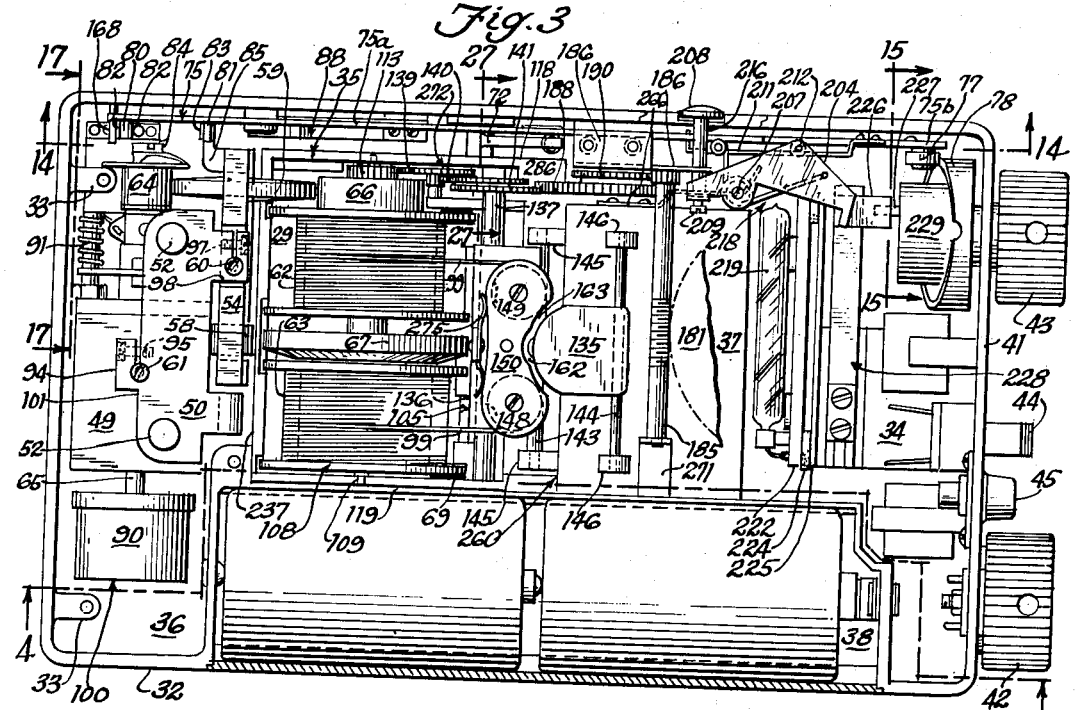
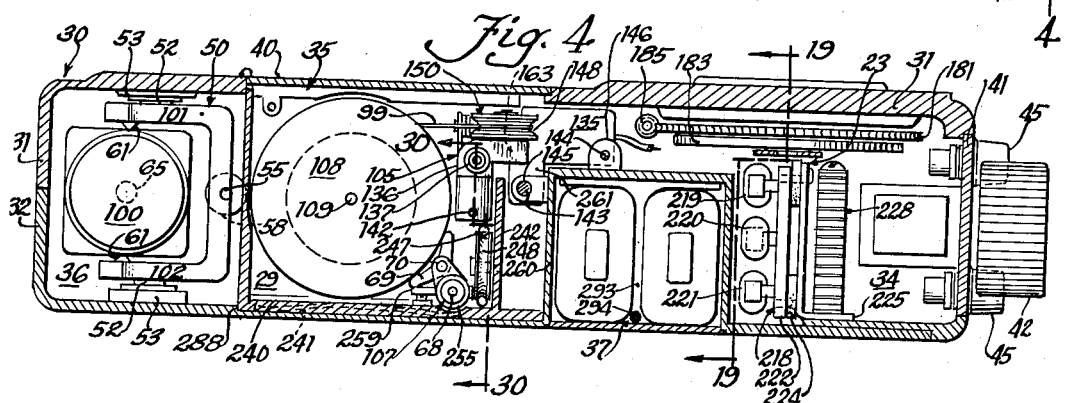
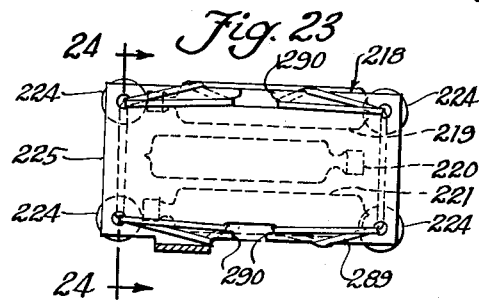
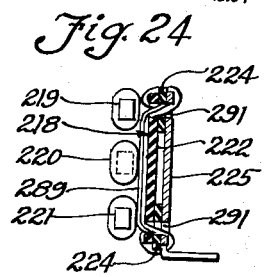
INVENTOR.
Louis A. McNabb
BY
Thiess, Olson & Mecklenburger
Att'ys July 19, 1955

L. A. McNABB 2,713,618

POCKET RECORDER

Filed Dec. 7, 1949

INVENTOR.
Louis A. McNabb
BY
Kiess, Olson & Mecklenburger
Att'ys

July 19, 1955

L. A. McNABB 2,713,618

POCKET RECORDER

Filed Dec. 7, 1949

INVENTOR.
Louis A. McNabb
BY
Thiess, Olson & Mecklenburger
Att'ys

July 19, 1955
L. A. McNABB
2,713,618
POCKET RECORDER
Filed Dec. 7, 1949
7 Sheets-Sheet 5
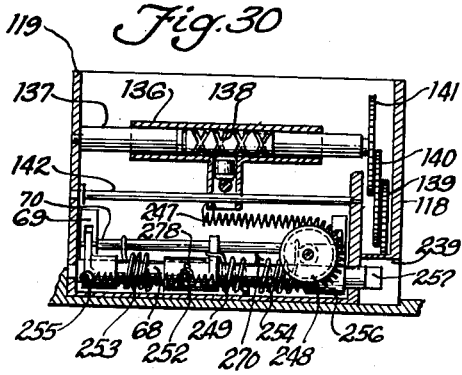
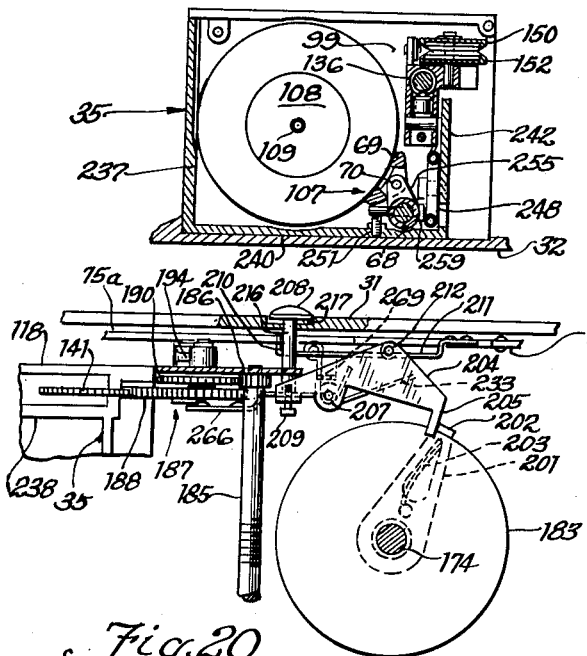
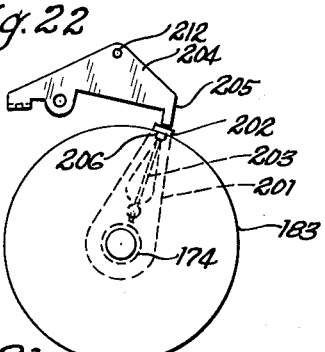
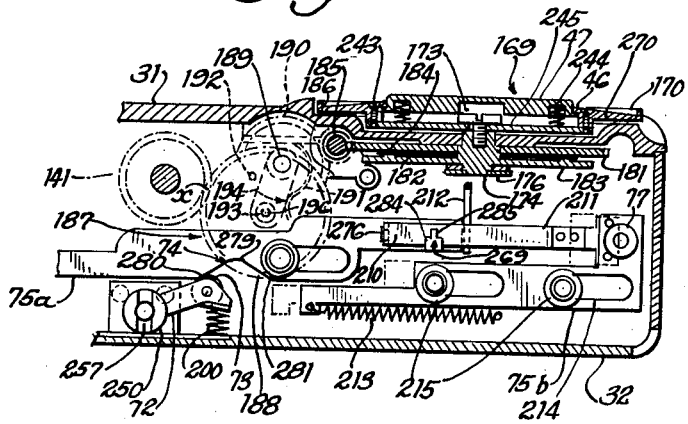
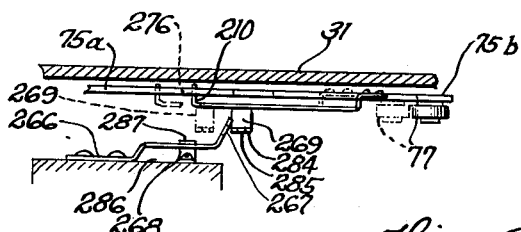
INVENTOR.
Louis A. McNabb
BY
Thiess, Olson & Mecklenburger
Att'ys July 19, 1955
L. A. McNABB
2,713,618
POCKET RECORDER
Filed Dec. 7, 1949
7 Sheets-Sheet 6
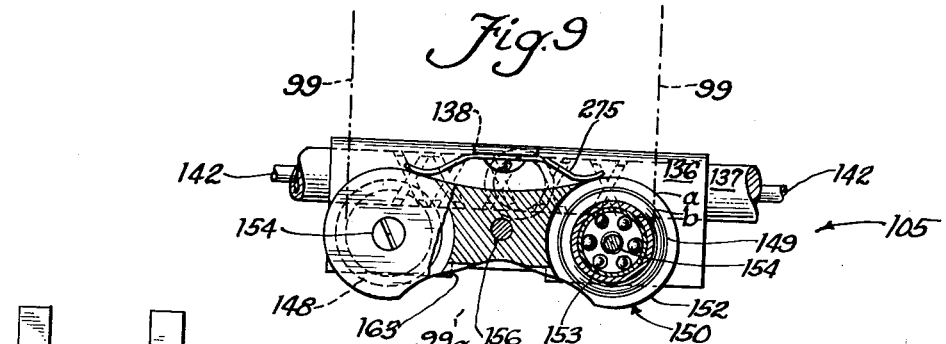
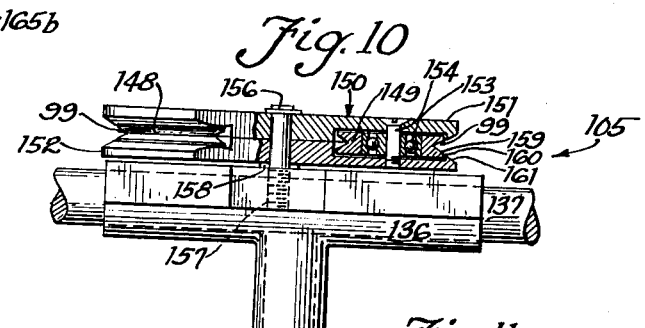
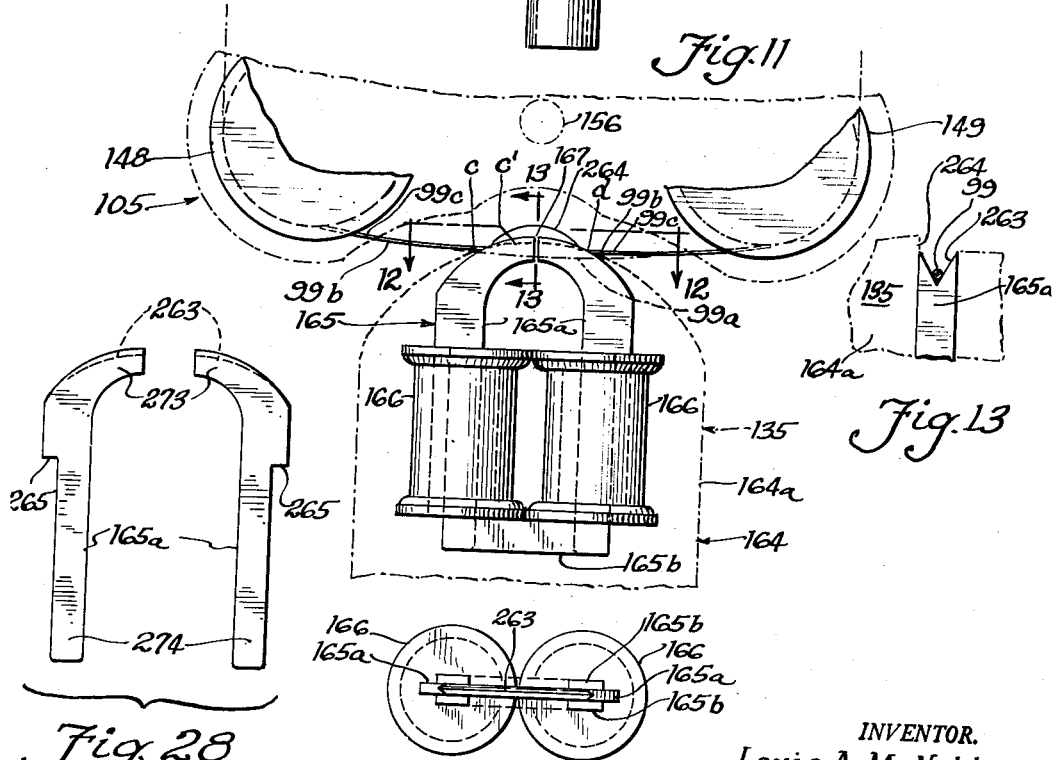
INVENTOR.
Louis A. McNabb
BY
Thiess, Olson & Mechlenburger
att'ys July 19, 1955
L. A. McNABB
2,713,618
POCKET RECORDER
Filed Dec. 7, 1949
7 Sheets-Sheet 7
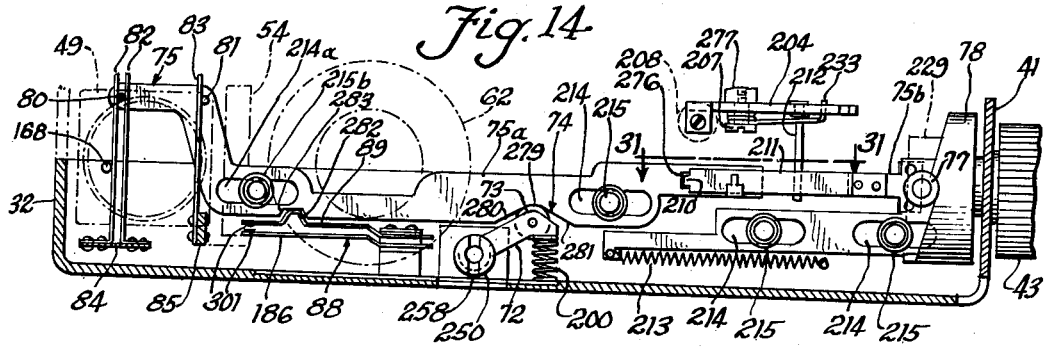
Fig. 14
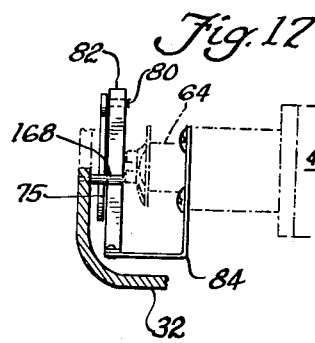
Fig. 12
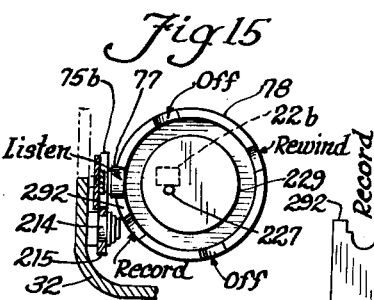
Fig. 15
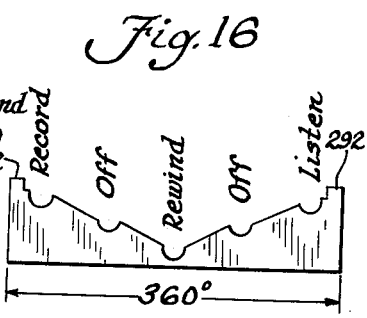
Fig. 16
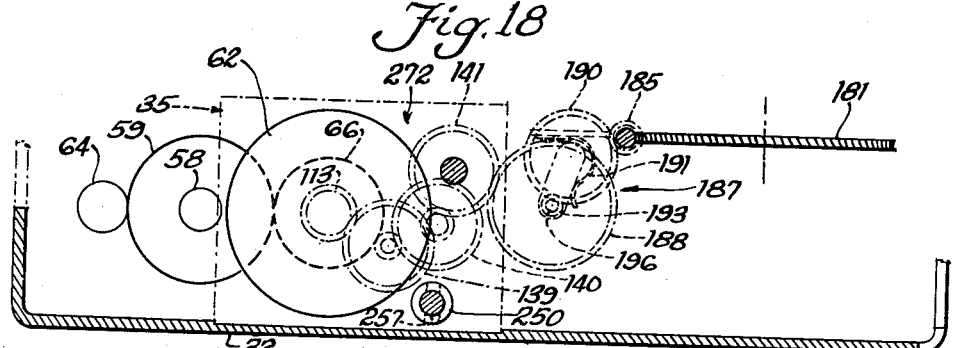
Fig. 18
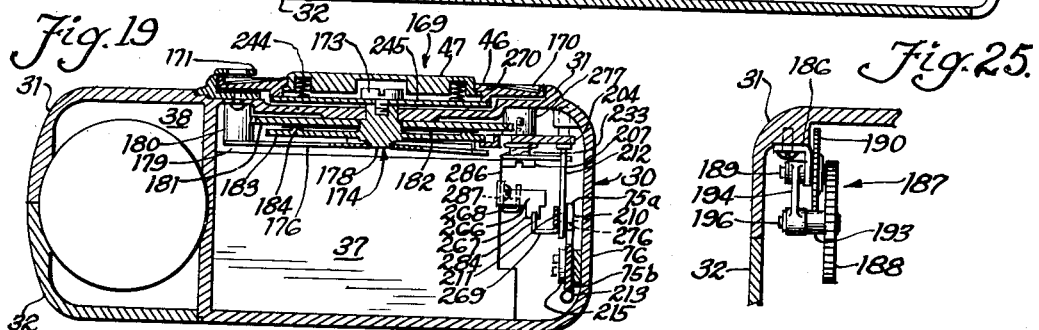
Fig. 19
Fig. 25
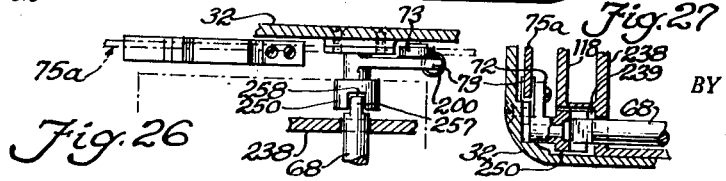
Fig. 26
Fig. 27
INVENTOR.
Louis A. McNabb
BY Kiesz, Olson &
Mecklenburger
Att'ys United States Patent Office 2,713,618
Patented July 19, 1955

2,713,618

POCKET RECORDER

Louis A. McNabb, Davenport, Iowa

Application December 7, 1949, Serial No. 131,573

15 Claims. (Cl. 179—100.2)

This invention relates to combination magnetic recording and reproducing devices, more particularly, to portable devices of this class, and has for an object the provision of an improved portable recording device sufficiently small and compact to enable its being carried in a normal size overcoat pocket.

Portable magnetic recording devices have, heretofore, been made. Such devices, however, have required an exterior or independent source of power to drive the recording medium along a predetermined path, to energize the recording head, and to amplify the reproduced signal during playback. These prior portable types of magnetic recording and reproducing devices have been necessarily limited in their general adaptability in that they could not be used in situations where there were no available independent power supplies. Moreover, such prior devices have been relatively bulky and heavy.

It is frequently desirable, in many fields of endeavor, such as on-the-spot news reporting, taking inventory, or any activity where immediate impressions are to be noted for later reference, that conversations be recorded while the operator is moving from one point to another. It may also be necessary to conceal the recorder on the person of the user.

To meet these problems, it has been suggested that portable magnetic recording and reproducing devices be adapted not only to include self-contained power supplies, but also to be of sufficiently lesser bulk and weight to enable their being carried or concealed in an overcoat pocket and used while being held in one hand of the operator. Such suggested devices have not been completely satisfactory because of the large number of operating parts which must necessarily be confined within a very small space. Such devices, also, have been position sensitive, that is, for different positions of the recorder the stresses and torques acting upon the various mechanisms which comprise the moving parts of the device have varied. In some instances the forces in one or more positions have been sufficiently abnormal to prevent operation. These differing forces also may introduce other undesirable effects such as "wows."

Magnetic recording and reproducing devices must generally comprise a motor and associated driving mechanism, a magazine having spools for holding and guiding the wire medium during recording and reproducing, a head for recording and reproducing, an amplifier for energizing the head for recording and amplifying the signal on reproducing, an indicator to denote the position of the recording medium, control mechanism, and power supplies for the various elements. These elements, when embodied in a pocket-size portable recorder adapted to contain them in operating relationship within a space sufficiently small for the device to be carried in an overcoat pocket, necessarily are disposed very close to each other. Moreover, it becomes imperative to have exceedingly small clearances between the operating parts as well as to maintain substantially constant distances between the engaging and non-engaging positions of related moving parts in all positions of the recorder. Prior pocket-size recorders have had shortcomings in the requirements indicated, which shortcomings contributed in substantial measure to the position sensitivity of these devices.

Accordingly, it is a further object of this invention to provide an improved pocket-size portable magnetic recording device of the class described which will operate properly regardless of the position in which the device is laid or held.

A further object of this invention is to provide an improved pocket-size magnetic portable recording device of the character described which is substantially free from "wows."

A still further object of this invention is to provide an improved pocket-size portable magnetic recorder of the class described wherein the radial forces acting on the friction drive roilers when operating are reduced to a required minimum regardless of the position of the recorder.

A still further object of this invention is to provide an improved pocket-size portable magnetic recorder of the class described wherein the radial forces exerted between the friction drive rollers is substantially zero when the recorder is not operating.

A still further object of this invention is to provide an improved pocket-size portable magnetic recorder of the class described wherein the wire medium guide rollers are always properly positioned relative to the direction of the wire leading from the spools.

A still further object of this invention is to provide an improved pocket-size portable magnetic recorder of the character described wherein a cartridge holding the recording medium may be replaced without the necessity of the operator touching the medium itself.

A still further object of this invention is to provide an improved pocket-size portable magnetic recorder of the class described wherein the effects of cyclical variations in medium speed due to momentary or transient mechanical disturbances in the instantaneous driving speed, whether these result from electrical or mechanical sources, are eliminated.

A still further object of this invention is to provide an improved pocket-size portable magnetic recording device of the class described wherein breakage of the wire medium is immediately indicated.

A still further object of this invention is to provide in a pocket-size magnetic recording device of the class described, an improved indicator mechanism to denote the amount of recording medium used or unused.

A still further object of this invention is to provide in a pocket-size magnetic recording device of the class described, an improved braking mechanism operable when the recorder is turned off either manually or automatically.

A still further object of this invention is to provide in a pocket-size magnetic recording device of the class described, a simplified and convenient control switch means.

A still further object of this invention is to provide in a pocket-size magnetic recording device of the class described improved means whereby fouling of the wire medium guide is substantially eliminated.

Further objects and advantages of this invention will become apparent in the following description taken in connection with the accompanying drawings and appended claims.

In carrying out this invention in one form, there is provided a casing for a recorder measuring approximately 1¾" x 4¼" x 7" and having a girth around its smaller dimension of approximately 11", this girth being sufficiently small to enable the recorder to be carried on end in a normal overcoat pocket. One form of such a pocket-size recorder, when fully assembled, weighed approximately 2½ pounds including both a removable cartridge which carries a wire medium and supporting spools, and a complete power supply comprising two dry cells and two miniature "B" batteries.

Within the casing of the recorder referred to there are provided five compartments. The forward compartment, adjacent the front panel of the recorder upon which the various control switches are mounted, contains an amplifier, appropriate electrical connections, a master control cam mechanism, an indicator card drive mechanism, and an auxiliary brake activating mechanism. An indicator card for showing the amount of used and unused wire medium is mounted above the first compartment and outside the top cover of the casing. A second compartment, rearwardly of the first and adjacent the base of the recorder, contains two "B" batteries. A third compartment, rearwardly of the second, contains a removable cartridge or magazine which holds a wire medium, record and rewind spools adjacently supported on a shaft so as to rotate independently of each other, and a level wind mechanism. A recording and reproducing head is mounted on a frame and carriage, generally rearwardly and above the "B" battery compartment, so as to reciprocate with the level wind mechanism during operation of the recorder. The third compartment also contains an equalized braking mechanism and various gears and friction rollers for driving the record and rewind spools and level wind mechanism.

A fourth compartment, located at the rear of the recorder, contains a motor assembly pivotally mounted upon an axis passing through its center of gravity. This compartment also contains a countershaft assembly including rollers by means of which power developed by the motor is transmitted from the motor to the wire medium record and rewind spools in the cartridge. This countershaft assembly likewise is pivotally mounted upon an axis passing through its center of gravity.

A fifth compartment, adjacent the left wall of the casing and substantially midway thereof, contains two dry cells and appropriate electrical terminals and connections.

A master control rod, reciprocatively operable by means of a cam mechanism in the first compartment and a master control switch mounted outside the front panel of the recorder, extends lengthwise of the recorder along and inside of the right side casing thereof and is guided therealong by rollers mounted on the casing and operable within slots in the master control rod. Reciprocation of the master control rod brings the motor driven counter-shaft rollers into engagement with the record or rewind spool drive rollers, operates an electrical control switch for the motor, and actuates the braking mechanism.

For a more complete understanding of the invention, reference should be made to the accompanying drawings wherein:

Fig. 3 is a full-size plan view of the recorder with the top half of the casing removed;

Fig. 4 is a sectional elevational view taken substantially along line 4—4 in Fig. 3;

Fig. 8 is a sectional view of the cartridge reduced to full scale taken substantially along line 8—8 in Fig. 6;

Fig. 9 is a fragmentary view partially broken away and partially in section of Fig. 6;

Fig. 10 is an elevational view partially in section of the structure shown in Fig. 9;

Fig. 11 is a top view on an enlarged scale partially schematic and partially in phantom lines of certain components of the recorder illustrating the functions thereof;

Fig. 12 is a rear elevational view of certain components of the magnetic head taken substantially in the direction of arrows 12—12 in Fig. 11;

Fig. 13 is a view taken substantially along line 13—13 in Fig. 11;

Fig. 14 is a sectional elevational view taken substantially along line 14—14 of Fig. 3;

Fig. 15 is a view taken substantially in the direction of arrows 15—15 of Fig. 3;

Fig. 16 is a view of the developed surface of the cam shown in Fig. 15;

Fig. 17 is a sectional view partially in phantom lines taken substantially along line 17—17 in Fig. 3;

Fig. 18 is a diagrammatic view showing the arrangement of certain gears, rollers, and spools of the recorder;

Fig. 19 is a sectional view taken substantially along line 19—19 of Fig. 4;

Fig. 20 is a plan view of the automatic shut-off and associated mechanism;

Fig. 21 is an elevational view partially in section of the structure shown in Fig. 20 and of the indicating mechanism;

Fig. 22 is a fragmentary view of the structure shown in Fig. 20 but in a different operative position;

Fig. 23 is an elevational view partially in phantom and partially in section of certain components of the recorder taken in the direction of the arrows 23—23 in Fig. 4;

Fig. 24 is a sectional view taken along line 24—24 in Fig. 23;

Fig. 25 is an elevational view of certain of the gear components partially in section of Fig. 21;

Fig. 26 is a fragmentary plan view of certain components of the braking mechanism and motor switch partially in section of Fig. 14;

Fig. 27 is a sectional view of certain components of the braking mechanism taken substantially along line 27—27 in Fig. 3;

Fig. 28 is a plan view of certain components of the structure shown in Fig. 11;

Fig. 29 is a plan view of another component of the structure shown in Fig. 11;

Fig. 30 is a sectional view taken substantially along line 30—30 in Fig. 4;

Fig. 31 is a partial plan view of certain components of the recorder taken in the direction of arrows 31—31 in Fig. 14.

Figure 1:
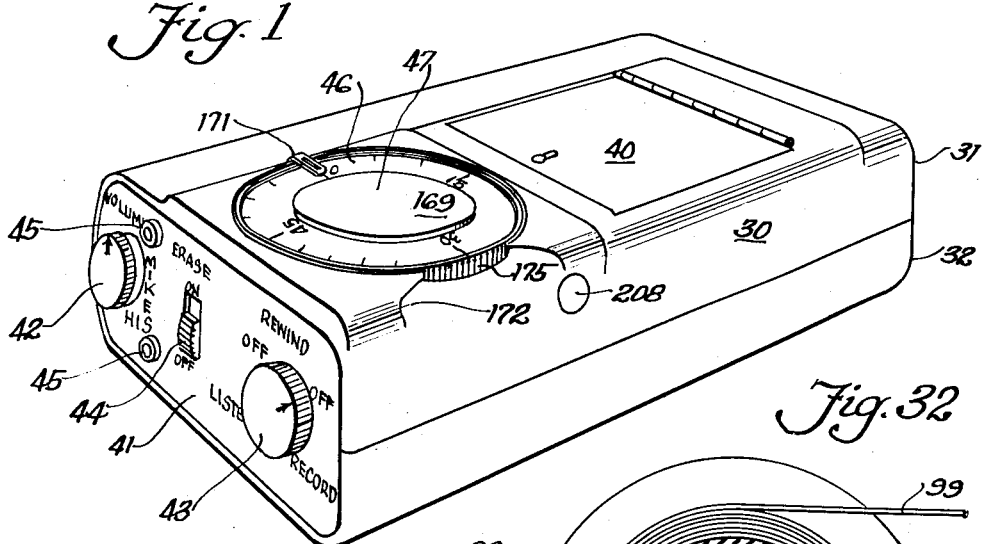
Figure 1 is a top perspective view of a recorder embodying the invention.

Referring to the drawings, more particularly to Figs. 1 through 4, there is shown a recorder embodying the invention comprising a metallic casing 30, having an upper portion 31 and a lower portion 32 joined together by means of screws (not shown) which clamp upon upper portion 31 and are engageable with threaded bosses 33 on lower portion 32. Lower portion 32 is provided with rubber pads 48 to serve as insulators and vibration absorbers when the recorder is resting upon a foreign surface. Front panel 41 of the casing is designed to have mounted thereon volume control switch 42, master control switch 43, erase control switch 44, and microphone and earphone plug-in connections 45.

Figure 2:
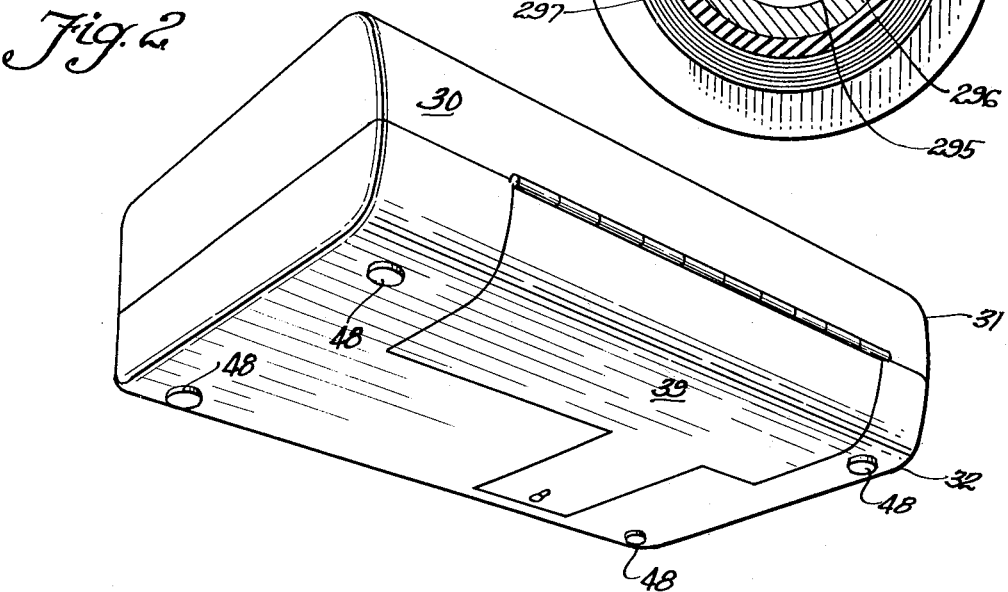
Fig. 2 is a bottom perspective view of the recorder shown in Fig. 1.

The interior of the recorder comprises generally five compartments previously referred to: an amplifier compartment 34, a cartridge compartment 29 adapted to receive a removable cartridge or magazine 35, a motor compartment 36, a "B" battery compartment 37, and an "A" battery compartment 38. When the pocket-size recorder is completely assembled, access to battery compartments 37 and 38 is attained by opening a hinged cover 39 in lower portion 32 of the casing, as shown in Fig. 2. Access to the cartridge or magazine 35 is attained by opening hinged cover 40 in upper portion 31 of the casing, as shown in Fig. 1. Upon the upper portion 31, there is also mounted an indicator card 46 (Figs. 1 and 19) whereby, as will be described hereinafter, it is possible for the operator of the recorder to tell how much wire medium has been used and how much is still available.

Figure 5:
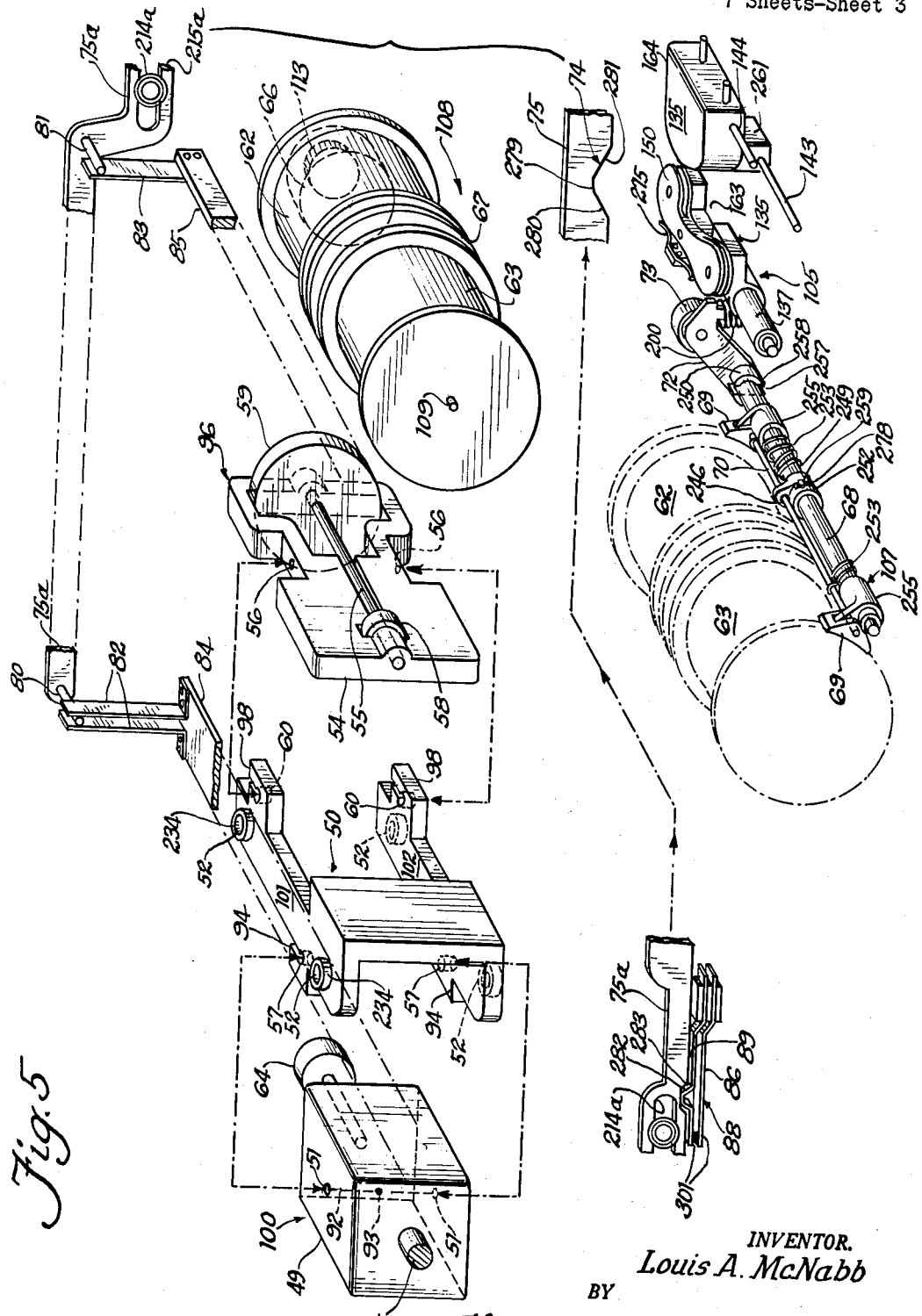
Fig. 5 is a schematic exploded view in perspective illustrating diagrammatically the relative positions of certain components of the recorder.

In motor compartment 36, there is provided a motor assembly 100 comprising a permanent magnet type motor 49, a centrifugal type governor 30, a Bakelite motor roller 64 and friction clutch mounted upon motor shaft 65, a motor brush spring and mounting 91, and a motor bracket 84 rigidly secured to motor 49 and having a pair of upwardly extending resilient fingers 82, as shown best in in Figs. 3, 5, and 14. Motor shaft 65 extends transversely of motor compartment 36 and is disposed substantially at mid-height and slightly rearwardly of the longitudinal center thereof as seen best in Fig. 4. Motor assembly 100 is pivotally mounted and supported upon a yoke-shaped frame 50, as shown in Figs. 3 and 4, and schematically in Fig. 5. A normally vertical line 92, Fig. 5, defined by indented points of support 51 diametrically opposed on motor 49 passes through the predetermined center of gravity 93 (with respect to all axes) of motor assembly 100. Diametrically opposed holes 57 provided in rear fingers 94 of yoke frame 50 are adapted to receive conical studs 61 for pivotally supporting motor assembly 100 at points 51, as shown in Figs. 4 and 5. Set screws 95 (Fig. 3) engageable with rear fingers 94 and yoke frame 50 serve to secure conical studs 61 within holes 51.

In motor compartment 36, there is further provided a countershaft assembly 96 (Fig. 5) comprising a countershaft frame 54, a countershaft 55, rubber roller 59 and steel roller 58, both secured to countershaft 55 so as to rotate therewith, and a bracket 85 rigidly secured to countershaft frame 54 and having an upwardly extending resilient finger 83. Countershaft 55 is mounted on frame 54 by means of ball and frictionless pivot bearings (not shown) of the so-called micro variety. As shown in Fig. 3 and schematically in Fig. 5, countershaft assembly 96 is mounted upon and supported by yoke frame 50 in a manner similar to the mounting of motor assembly 100. Points of support 56 diametrically opposed on the countershaft frame define a normally vertical line (not shown) which passes through the predetermined center of gravity (not shown) with respect to all axes of the countershaft assembly. Diametrically opposed holes 60 (Figs. 3 and 5) provided in forward fingers 98 on yoke frame 50 are adapted to receive conical studs similar to studs 61 (Fig. 3) for mounting motor 49. Set screws 97 engageable with forward fingers 98 and yoke frame 50 serve to secure these conical studs within holes 60.

As thus assembled, yoke frame 50 is disposed in motor compartment 36, as shown in Figs. 3 and 4, pairs of studs 52 on upper flange 101 and lower flange 102 of the yoke frame being adapted to be received in bosses 53 provided on respective portion 31 and 32 of the casing. The studs are surrounded by vibration-damping washers 234 which may be made of rubber.

Motor assembly 100 and countershaft assembly 96 are disposed upon yoke frame 50 whereby drive roller 64 is closely disposed adjacent countershaft roller 59. When the recorder is not operating, only very slight grazing contact, if any, exists between the peripheries of rollers 59 and 64 and the radial forces exerted therebetween are substantially zero, this contact being insufficient to produce depressions of the roller peripheries which would cause flats on the rollers and the so-called "wows" resulting therefrom. Only slight relative movement of these rollers from their non-operating positions is needed to produce the contact required for driving engagement during operation of the recorder.

Motor roller 64 is maintained in engagement or non-engagement with countershaft roller 59 by means of the laterally extending brackets 84 and 85 and the resilient fingers 82 and 83 respectively, cooperating with suitably disposed lugs 80 and 81 on the rear portion 75a of a master control rod 75. Thus, reciprocation of the master control rod, as will be described hereinafter, causes motor assembly 100 and countershaft assembly 96 to pivot about their points of support 51 and 56 respectively. Due to the resiliency of fingers 82 and 83, movement of the master control rod only a small distance in either direction from a non-operating position causes a substantially smaller relative movement, in the order of one one-hundredth of an inch, of rollers 59 and 64, whereby these rollers are urged into the contact required for driving.

Stop pin 168, secured to and extending inwardly from the right side 76 of casing portion 32 (Figs. 14 and 17), serves to determine and check the counterclockwise rotation of motor assembly 100 by limiting the rearward movement of fingers 82, thus assuring proper driving contact between rollers 59 and 64 when recording or listening as will hereinafter be described.

By thus connecting pivotally mounted motor assembly 100 and countershaft assembly 96 to master control rod 75, motor shaft 65 and countershaft 56 are kept substantially parallel regardless of the absolute positions given to both by reciprocation of the master control rod. Such a constantly parallel relationship, and the resiliency of fingers 82 and 83, tend to maintain substantially constant frictional forces between motor roller 64 and crankshaft roller 59 when operating, as well as substantially frictionless contact between these rollers when non-operating, and thereby prevents the development of undesirable "flats" on these rollers which is a source of "wows." Changes in the frictional forces acting between motor roller 64 and countershaft roller 59 are further minimized as hereinbefore described, by mounting the motor assembly 100 and the countershaft assembly 96 on axes passing through their respective centers of gravity. By virtue of such mountings, the motor assembly and countershaft assembly will not tend to shift relative to each other when the recorder is placed in different positions.

The cartridge compartment 29 is immediately forwardly of the motor compartment and receives the removable cartridge 35 comprising a spool assembly 108 for supporting wire medium 99, a level wind and mechanical filtering mechanism 105, and a braking mechanism 107.

Figure 6:
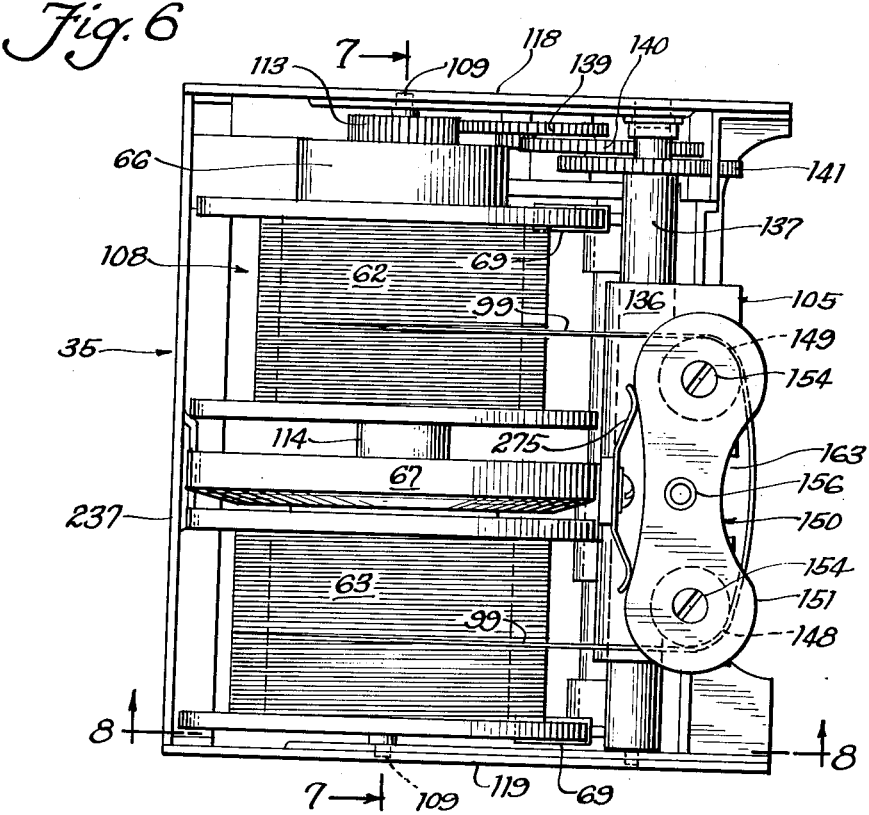
Fig. 6 is a plan view on an enlarged scale of the removable cartridge with its top cover removed to reveal certain of its components.
Figure 7:
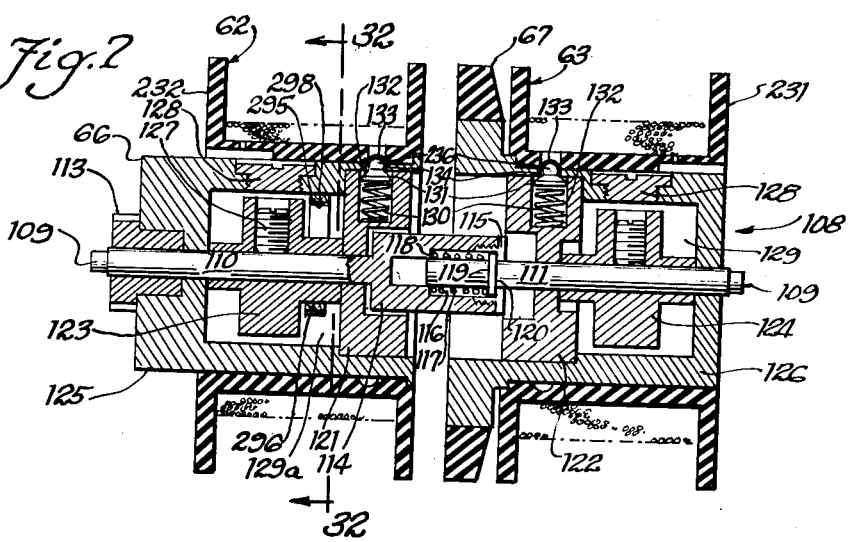
Fig. 7 is a sectional elevational view taken substantially along line 7—7 in Fig. 6.

Referring to Figs. 6 and 7, spool assembly 108 comprises a rewind spool 62 and a record spool 63 (made of aluminum, for example) mounted upon female portion 110 and male portion 111, respectively, of discontinuous shaft 109. The spools are rotatable independently of each other. Record spool 63 comprises a reel 231, a hub 126, and a bushing 122, bearing with shaft portion 111 being had by the hub and the bushing. A spacer 124 is arranged between the hub and the bushing for holding spool 63 to the shaft. Spool 62 includes similar parts. A tapered rubber roller 67 is mounted upon hub 126 for drive purposes, a similar purpose being served for reel 62 by an extension 66 of hub 125. Drive gear 113, which provides the driving power to operate level wind mechanism 105, is secured to hub 125 so as to rotate therewith.

The manner of assembling spool assembly 108 and the remaining structure thereof may best be visualized by reference to Fig. 7. The female portion 110 and male portion 111 of shaft 109 are held in axial alignment by means of threadably engaged sleeves 114 and 115 designed to provide an annular space 116 surrounding the inner end of male portion 111. Spring 117 compressed between shoulder 118 on sleeve 114 and shoulder 119 on shaft 111 operates to keep the two shaft portions apart. As thus connected shafts 110 and 111 can telescope to facilitate the mounting of spool assembly 108 between side walls 118 and 119 of cartridge 35, as shown in Fig. 6, spring 117 serving to hold the shaft portions apart and consequently hold the spool assembly in the cartridge.

Following the alignment of shaft portions 110 and 111, bushings 121 and 122 are placed on the inner ends thereof, followed by spacers 123 and 124, of molded plastic, for example, and Bakelite hubs 125 and 126.

Spacers 123 and 124 are secured to the shaft portions 110 and 111, respectively, by tightening set screws 127. Access to set screws 127 is attained by removing plugs 128 provided in hubs 125 and 126. After plugs 128 are replaced, springs 130, and locking pins 131, are inserted in radial holes 132 provided in bushings 121 and 123. Reels 232 and reel 231 are urged axially onto hubs 125 and 126, respectively. The reels are held in place by the tips 236 of pins 131 partially contained in apertures 134 in hubs 125 and 126, and engageable with annular grooves 133 in the reels, which grooves are alignable with apertures 134. By reason of the annular grooves 133 the reels may be pushed onto the hubs without regard to orientation and rotated until the pins are received in appropriately placed holes in the spools. Lubrication of the various bearing surfaces may be maintained by application of a few drops of oil when required.

Figure 32:
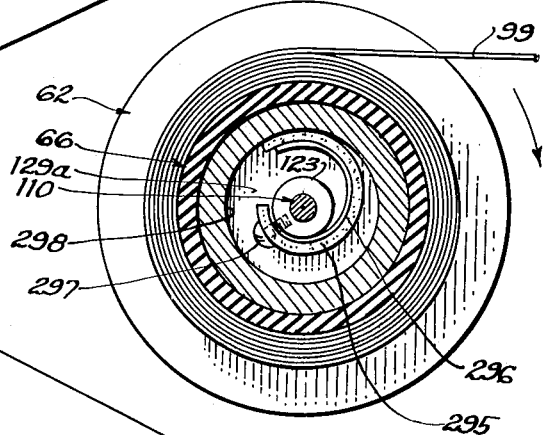
Fig. 32 is a sectional view taken substantially in the direction of arrows 32—32 of Fig. 7.

As shown in Figs. 7 and 32, a felt strip 295 and a leaf spring 296 embracing the felt strip radially inwardly thereof are coiled around a reduced portion of spacer 123 and have one end secured thereto by a screw 297, the other ends being unsecured. The direction of coiling of the felt is such that when rewind spool 62 and hub 125 are rotating in a direction for recording and listening (see arrow, Fig. 32) the tendency of the felt to unwrap from the coiled position is aided and abetted by friction against the cooperating inner surface 298 of hub 125, and such that upon rotation of spool 62 and hub 125 in a direction required for rewinding (opposite to the arrow, Fig. 32), the felt strip tends to wrap or coil further around spacer 123 so as to decrease the friction against hub 125, for purposes to be described hereinafter.

As thus assembled, spool assembly 108 is mounted in cartridge 35 transversely thereof adjacent the rear wall 237 of the cartridge, shaft 109 being supported between said walls 118 and 119 of the cartridge, as shown in Figs. 3 and 6. When the cartridge is inserted in cartridge compartment 29, the peripheries of spool rollers 66 and 67 are disposed adjacent countershaft rollers 59 and 58 respectively. Wall 237 is provided with apertures (not shown) aligned with the countershaft rollers through which these rollers may pass in order to engage the spool rollers. These apertures extend upwards from the bottom 240 of the cartridge and have continuations (not shown) extending forwardly of wall 237 in the bottom 240 of the cartridge to enable insertion of the cartridge which would otherwise be obstructed by the countershaft rollers. When the cartridge is inserted, it is maintained in proper alignment by means of a recess 288 (Fig. 4) provided in the bottom of the cartridge comparment. A spring 241 secured in the recess serves to partially eject the cartridge when cover 40 is opened.

When the recorder is not operating, only very slight grazing contact, if any, exists between the peripheries of rollers 59 and 58, and 66 and 67 respectively, and the radial forces exerted therebetween are substantially zero, this contact being insufficient to produce depressions of the roller peripheries which would cause flats on the rollers and the so-called "wows" resulting therefrom. When master control rod 75 is actuated forwardly, as will be hereinafter described, motor assembly 100 and countershaft assembly 96 are caused to rotate clockwise whereby countershaft roller 59 is urged into driving engagement with spool roller 66 thereby driving rewind spool 62. When the master control rod 75 is actuated rearwardly, the motor assembly and countershaft assembly are rotated counterclockwise whereby countershaft roller 58 is urged into driving engagement with spool roller 67 to drive record spool 63. Countershaft roller 59 or 58 need only be moved forwardly a very small distance, in the order of 1/100 of an inch, in order to accomplish the desired contact required for driving spool roller 66 or 67, respectively.

In order to stop the rotation of spools 62 and 63 when discontinuing operation, and in order to lock the spools when it is desired to remove the cartridge from the recorder, a brake mechanism 107 is provided in the cartridge so as to be removable therewith. A brake shaft 68, rotatably secured between longitudinal cartridge walls 119 and 238 (Figs. 26 and 27) extends transversely of the cartridge, forwardly of the spools, and adjacent to the bottom 240 of the cartridge as shown in Figs. 5 and 30. Shaft 68 carries a pair of arms 255 keyed to the shaft so as to be axially fixed but free to rotate thereupon. Brake shoes 69 aligned with the rims of spools 62 and 63, are pivotally secured to the radially outward portions of arms 255 by means of an equalizer bar 70 extending between arms 255 and rotatably engaging aligned apertures (not shown) in shoes 69 and arms 255. The rod 70 is positioned offset upwardly from a plane defined by spool shaft 109 and brake shaft 68, as shown in Fig. 8. Thus, rotation of the spools in a clockwise direction tends to cause the brake shoes to jam against the rims, i. e., the brakes are rendered self-energizing. Springs 253 are secured to and extend between rod 70 and shaft 68, as shown in Fig. 5.

A third arm 252 is secured to shaft 68 substantially midway of arms 255 by means of a screw 259 extending therethrough and rearwardly thereof as shown in Fig. 8. Arm 252 is provided with an arcuate slot 278 (Fig. 5), through which screw 259 also passes, whereby arm 252 may be adjusted circumferentially on shaft 68. The rear end of screw 259 rests upon an adjusting screw 251, as shown in Fig. 8. Arm 252 is further provided with a slot 246 (Fig. 5) extending transversely through the radially outward portion thereof and adapted to receive and loosely support therein equalizer bar 70, slot 246 being sufficiently large to permit substantial freedom of movement of bar 70 therein. By reason of slot 246 being oversize, springs 253 will urge arms 255 and their cooperating shoes 69 against the rims of both spools 62 and 63 so that the spools will be braked simultaneously to prevent snarling of the wire medium running therebetween. Spring 249 encompassing the shaft 68 adjacent arm 252 is secured between the radially outward portion of arm 252 and the bottom of the cartridge, as shown in Fig. 30.

The right end of brake shaft 68 is provided with a normally vertical tongue 257 adapted to be snugly received in a normally vertical slot 258 provided in the lower portion 250 of pivot arm 72, as shown in Fig. 5. Pivot arm 72 has mounted thereupon a roller 73 which acts as a cam follower and is received by a V-shaped cam slot 74 provided in the rear portion 75a of the master control rod. As shown in Figs. 26 and 27, arm 72 is pivotally secured to the lower casing 32 and is actuated by reciprocation of the master control rod as will be hereinafter described.

As shown in Fig. 14, compression spring 200 biases arm 72 so that roller 73 will follow the contour of slot 74. When the rear portion 75a of the master control rod is in the position shown in Fig. 14, roller 73 engages the central portion 279 of slot 74 which serves as a detent to locate the master control rod in an OFF position. When the recorder is set to Rewind, as will be hereinafter described, roller 73 embraces the rear portion 280 of slot 74, as shown in Fig. 21. When the recorder is set to Record or Listen, roller 73 embraces the forward portion 281 of slot 74. When the recorder is turned OFF from either Rewind, Record, or Listen, as will be hereinafter described, roller 73 moves to central portion 279 and arm 72, causing brake shaft 68 to pivot counterclockwise (viewed as in Fig. 14), whereby the brake shoes engage and stop the wire medium supporting spools.

Since the brake mechanism 107 (Fig. 5) is removable from the recorder along with the cartridge, slot 258 in arm 72 and tongue 257 on the brake shaft must be engaged and aligned substantially vertically when the brakes are on to permit vertical withdrawal of the tongue from and reinsertion thereof into the slot when the cartridge is removed and replaced respectively. Spring 200 and slot 74, as shown in Fig. 14, act upon pivot arm 72 to insure that slot 258 will be substantially vertical when the recorder is turned off and the brakes applied. To insure that tongue 257 will be vertical and thereby engageable with slot 258 when the cartridge is replaced after removal from the recorder, the shaft 68 is held in the proper position by the engagement of the rearward end of screw 259 with the upper end of the vertical adjusting screw 251, the spring 249 serving to hold these members against each other.

Cartridge 35 further comprises level wind mechanism 105 mounted forwardly of spool assembly 108 and between side walls 118 and 119, as shown in Figs. 3, 4, 6, and 8. The level wind mechanism serves both to distribute the wire medium uniformly over the reels and to guide the wire in its path along the magnetic recording and reproducing head 135. The level wind mechanism comprises a frame 136 mounted upon a shaft 137 and adapted to reciprocate therealong by means of double reverse helical gear 138 provided on shaft 137, as shown in Figs. 9 and 30. Helical gear 138 comprises a groove adapted to receive a pin 299 secured to a member 300 supported inside frame 136 (Fig. 30). Shaft 137 is mounted between side walls 118 and 119 of cartridge 35 and is driven in either direction by a gear train 272 (Figs. 3 and 18) comprising drive gear 113, secured to spool shaft 109, stepped gears 139 and 140 suitably supported on the cartridge walls, and level wind gear 141 secured to level wind shaft 137. The gear ratio is such that level wind mechanism 105 will reciprocate transversely of cartridge 35 so as to adequately accommodate the winding and unwinding of medium 99 on spools 62 and 63.

By reason of the reciprocation of level wind frame 136, the wire medium is wound upon or unwound from the spools in a regular manner. Inasmuch as the level wind mechanism is directly geared to the spools so that the position of the level wind mechanism is always in line with the direction of the wire moving from the spools, any sidewise or radial pulling of the medium as it is deposited upon or drawn from the spools is thereby eliminated. To insure against any transverse oscillations of the level wind frame during its transverse movement across the cartridge which might be caused by play in the engagement either of frame 136 with member 300 or of pin 299 with gear 138, especially when the direction of travel is reversed, spring 247 is provided, as shown in Figs. 8 and 30, both to bias frame 136 against member 300 and to bias pin 299 against gear 138. Spring 247 is secured between frame 136 and cartridge wall 119, and engages therebetween pulley 248 mounted near the right side of the forward cartridge wall 242, as shown in Fig. 30. Spring 247 is sufficiently long to provide adequate tension for all positions of the level wind frame along its path of travel.

As shown in Figs. 9 and 10, frame 136 of the level wind mechanism has mounted thereupon a pair of pulleys 148 and 149 rotatably secured to guard member 150 between an upper portion 151 and a lower portion 152 thereof. Pulleys 148 and 149 are mounted by means of friction reducing roller bearings 153 upon a pair of pins 154, the lower ends of which are threaded to engage lower portion 152 so as to secure guard portions 151 and 152 and pulleys 148 and 149 in proper alignment. As thus assembled, guard member 150 is pivotally mounted upon level wind frame 136 by means of a pin 156 extending vertically therethrough and threadably engaging hole 157 provided in frame 136. Washer 158 prevents lower portion 152 of guard member 150 from binding on frame 136. Pulleys 148 and 149 have conical circumferential grooves 159 for embracing and guiding wire medium 99. To prevent medium 99 from becoming snarled in the clearances between the pulleys and the guard member, or in other crevices proximate to the pulleys, the inwardly facing peripheries of upper and lower guard member portions 151 and 152, respectively, are beveled to converge inwardly, thereby forming discontinuous extensions 161 of pulley grooves 159. The pulleys thus lie in recesses (Fig. 10) within the portions 151 and 152. Since medium 99 traverses across the guard portions 151 and 152 along a line defined by points a and b, Fig. 9, it is impossible for medium 99 to become snarled or caught in the axial slots 160, Fig. 10, between pulleys 148 and 149 and the extensions 161.

A magnetic head 135 is mounted forwardly of and normally contiguous with level wind frame 136, and without the cartridge so as not to be removable therewith from the recorder. The magnetic head is slidably carried on rods 143 and 144 supported between pairs of bosses 145 and 146, respectively, provided on the "B" battery compartment casing 260, as shown in Figs. 3 and 4. By reason of an extension 162 (Fig. 3) on the rear end of head 135 which snugly engages a slot 163 provided in the forward end of level wind frame 136, magnetic head 135 is caused to reciprocate transversely of the cartridge as a unit with level wind mechanism 150.

Magnetic head 135 comprises a casing 164 (outlined in a dash-dot line in Fig. 11), a magnetic core 165, a pair of coils 166, and a recording gap 167. To permit pre-winding of the coils prior to assembling the head, the core 165 comprises a pair of central members 165a (Figs. 12 and 28) disposed, as shown in Fig. 11, to provide a gap 167 between the rear portions 273 thereof. Grooves 263 are provided in members 165a adjacent to the gap to receive wire medium 99. The coils after being wound, are placed on the forward portions 274 of members 165a and are urged against the shoulders 265. A pair of U-shaped outer core members 165b are then inserted axially through the coils, one above and one below the central members, as shown in Figs. 11 and 12, whereby the coils are securely held on the core by wedging of members 165b between the coils and central members. As thus assembled the core and coils are mounted (not shown) and enclosed within casing 164, the upper portion 164a of the casing being provided with a rearwardly extending nose 264 disposed immediately above the gap (Figs. 11 and 13) whereby the medium is directed into groove 263 upon insertion of the cartridge.

Fig. 11 illustrates schematically the positioning of the magnetic head with respect to level wind mechanism 105 to insure that wire medium 99 will contact the cooperating surface of the magnetic head along a substantial length thereof. Medium 99, when it passes around level wind pulleys 148 and 149, tends to bow outwardly (forwardly) from the pulleys, as shown by the dash-dot line 99a. The magnetic head is mounted relative to the level wind mechanism so that in this area medium 99 is caused to bow inwardly, as shown by solid line 99b. This causes medium 99 to engage the cooperating grooves 263 of head 135 over a substantial length thereof on each side of the recording gap, i. e., from points c to d, Fig. 11.

Changes in wire speed which are essentially oscillatory in character, and of a relatively high frequency, such as may be caused by transients in the system due to one spool tending to speed up a little faster than the other, introduce distortions known as "wows." The pivotal mounting of pulley guard 150 on level wind frame 136, and the relative position of head 135 with respect thereto, serve to eliminate this source of distortion by mechanical filtering. For example, if during recording or listening, record spool 63 should speed up slightly, the added instantaneous tension on medium 99 running between spool 63 and level wind pulley 148 will pull pulley 148 rearwardly and cause pulley guard 150 to rotate clockwise about pin 156. As this rotation takes place, the portion of medium 99 running between pulley 148 and magnetic head 135 will be pulled rearwardly to position 99c, so that the medium breaks contact with groove 263 at c', for example, instead of c. This movement of the medium does not move it away from the gap due to the contact of the medium with the head over a substantial distance on each side of the gap. Accordingly, during either recording or reproducing, oscillatory changes in wire speed caused by transients in the system will not pull the medium away from the gap to cause distortion known as "wows." To prevent excessive rotation in either direction of pulley guard 150 which might otherwise be caused by instantaneous changes in wire speed of abnormal magnitude or by abnormal acceleration, a dampening leaf spring 275, secured to the level wind frame, is disposed against guard 150, as shown in Fig. 9.

As shown in Figs. 3, 5, and 14, a motor control switch 88 is disposed between the cartridge compartment 29 and lower casing 32. Switch 88 comprises a resilient lower bar 86 and a resilient upper bar 89 having a pair of contact points 301. Upper bar 89 is provided with a raised portion 282 which is received in a slot 283 provided in rear segment 75a of the master control rod. Figs. 5 and 14 show the relative positions of raised portion 282 and slot 283 when the recorder is not operating and the master control rod is in an Off position, points 301 being out of contact with each other in this position so that no power is supplied to the motor. When the master control rod is moved either forwardly or rearwardly to an operating position, slot 283 cams bar 89 downwardly until points 301 make contact to supply power to the motor. Suitable electrical conductors (not shown) which may include "printed circuit" portions are provided.

In order that the operator will know at all times the amount of used and unused wire medium and in order that breakage of the medium may be detected, an indicator mechanism 169 is provided in upper casing 31 of the recorder near the front panel 41 thereof, as shown in Figs. 1, 19, and 21. Upper casing 31 is recessed to receive a circular disc 245 which is secured to hub 174 by screw 173. An annular ring 270 having an annular tapered recess 170 therein is supported on disc 245 and secured thereto by screws 243. An outer disc 47 is secured and held apart from disc 245 by means of springs 244 and the engagement of a shoulder forming the inner periphery of ring 270 with a shoulder forming the outer periphery of disc 47, as shown in Figs. 19 and 21. An annular indicator or cue card 46 having time markings thereon (Fig. 1) is bent over disc 47 so as to bow or bend into recess 170 wherein it is retained by reason of its elasticity.

A guide marker 171 is secured to upper casing 31 and extends inwardly over the indicator card to serve as a zero point for time measurements. The upper casing is provided with a recess 172 which exposes the serrated periphery 175 of disc 270 to facilitate manual adjustment of the indicator card. A retaining leaf spring 176, having a centrally located hole 177 for receiving the reduced lower end 178 of hub 174, serves to secure hub 174 in a normally fixed position vertically, the ends of spring 176 being secured by means of screws 179 to bosses 180 provided on upper casing 31, as shown in Fig. 19.

Beneath upper casing 31, an indicator card drive gear 181 is mounted upon hub 174 so as to rotate therewith by reason of friction disc 182 interposed between drive gear 181 and circular flange 183 integral with hub 174 near the lower end thereof, as shown in Figs. 19 and 21. Actual contact of friction disc 182 with flange 183 is had along the upper surface of annular ring 184 integral with flange 183. Drive gear 181, friction disc 182, and flange 183 (of hub 174) are normally held in frictional engagement by leaf spring 176.

Indicator card drive gear 181 is driven by worm gear 185 mounted horizontally and transversely of the recorder and rotatably secured between members 186 and 271, as shown in Figs. 3, 20, and 21. Member 186 also supports gear train 187 comprising gears 188, 190, and 193 (Figs. 18 and 20), by means of which worm gear 185 is driven by level wind drive gear 141 in the cartridge. The gear ratio between level wind drive gear 141 and indicator card drive gear 185 is such that one complete revolution of the indicator card represents a usable run (which may be approximately one hour) of medium 99 past recording head 135. Since the indicator card is thus driven by level wind drive gear 141 which in turn is driven by gear 113 rotatably with the rewind spool, any break in the medium running from the rewind to the record spool during recording would cause the rewind spool, and consequently the indicator card, to stop, thereby indicating the breakage.

Since level wind drive gear 141 is removable with the cartridge whereas gear train 187 comprising gear 188 is not, gears 188, 190, and 193 being in constant engagement, proper provision must be made to insure engagement and disengagement of gears 141 and 188 upon insertion and removal, respectively, of the cartridge. While inserting the cartridge, the teeth of gear 141 may abut the teeth of gear 188 rather than mesh therewith (i. e. interfere in the vicinity of point x, Fig. 21). These gears are made to mesh by pivotally mounting gear 188 and spring biasing it to move pivotally towards gear 141. Hence should the teeth of gears 141 and 188 abut during insertion of the cartridge, gear 188 may be pivoted counterclockwise (as viewed in Fig. 21) against its bias until proper meshing takes place. Thereafter the biasing spring maintains the gears in driving engagement. While the cartridge is being removed, the biasing spring causes gear 188 to pivot clockwise to follow the movement of gear 141 until disengagement of gear 141 from gear 188 can occur without creating substantial friction between the cooperating teeth of these gears.

To accomplish the foregoing, gear 188 is mounted on a shaft 196 rotatably carried at the lower end of a pivot arm 194. Arm 194 is rotatably supported at its upper end on a hub shaft 189, as shown in Figs. 18, 20, 21, and 25. Shaft 189 is rotatably supported by a bracket member 186 secured to upper casing 31 (Fig. 25). Spring 191 secured to member 186 biases arm 189 and consequently gear 188 counterclockwise (rearwardly) against gear 141 to maintain engagement therebetween when the cartridge is in place, or against stop pin 192 (Fig. 21) when the cartridge is removed.

Rewind and record spools, 62 and 63, respectively, may carry any desired length of wire medium 99, for example, a length sufficient to provide a usable recording run of approximately one hour. Of necessity, an excess length of wire medium must be provided on both spools 62 and 63 to prevent the medium from running off or being broken from the spools upon completion of a full run of recording, rewinding, listening, or erasing. It is therefore desirable to maintain an excess portion of medium 99 at each end of the usable portion thereof. It is further desirable that the excess of medium be prevented from accumulating at one end and diminishing at the other end, for if such a process is continued in one direction for a long enough time, the medium will run off one of the spools. Hence, automatic shut-off mechanism is provided to stop both motor 49 and spools 62 and 63 after a full run has elapsed, and means are provided for resetting the recorder thereafter for further operation without diminishing the excess of medium at either end of the usable portion thereof, and without disturbing the relationship between indicator card 46 and any point on medium 99.

To accomplish the foregoing, master control rod 75 comprises a rear segment 75a and a forward segment 75b normally connected during operation of the recorder by means of a pin 210 on trip spring 211 engaging an aperture 276 in segment 75a, as shown in Figs. 3, 14, 19, 20, and 21. Master control rod segments 75a and 75b are provided with a plurality of longitudinal guide slots 214 and 214a adapted to receive rollers 215 and 215a mounted upon the right side 76 of lower casing 32 whereby the master control rod may be reciprocated therealong. Cam follower 77 is rotatably secured to the forward end of segment 75b (Fig. 14), and is held against cam surface 78 by means of a spring 213 extending between forward segment 75b and lower casing 32, as shown in Figs. 14 and 21. As will be hereinafter described, cam surface 78 is caused to revolve by turning master control switch 43 on front panel 41, thereby reciprocating master control rod 75 to the desired operative position.

To provide for automatic shut-off of the recorder at the completion of a full run of wire medium 99, there is provided a shut-off arm 204 pivotally mounted upon screw 207 which engages a boss 277 (Fig. 19) provided on upper casing 31. An inwardly extending finger 205 at the forward end of shut-off arm 204 is normally biased against the periphery of hub flange 183 by means of a spring 233. A radial slot 206 (Fig. 22) provided in hub flange 183 is adapted to receive finger 205 upon the completion of an operating run. When finger 205 drops into slot 206, arm 204 pivots clockwise (as viewed in Fig. 20) and a downwardly extending pin 212 on arm 204 forces trip spring 211 inwardly and thereby withdraws pin 210 from aperture 276 in the rear portion 75a of the master control rod. When the rear portion is thus released from pin 210 and spring 213 is no longer operative thereupon, compression spring 200 (Fig. 14) in cooperation with resilient fingers 82 and 83 cause the rear portion of the master control rod to move forwardly if a Record or Listen run has been completed (or rearwardly if a Rewind run has been completed) thereby permitting roller 73 to engage central portion 279 of slot 74 and causing the brakes to be applied as hereinbefore described.

In order to reconnect the two portions of the master control for continued operation of the recorder following automatic shut-off from Record or Listen as hereinbefore described, the forward portion 75b of the master control rod is moved forwardly by turning master control switch 43 and cam 78 until cam follower 77 engages the Off detents (Fig. 16) on cam 78 adjacent the Record or Listen detents respectively. In this manner pin 210 on spring 211 is aligned with aperture 276 on the rear portion 75a. When so aligned, pin 210 is caused to engage aperture 276 by pressing the Reset button 208 as will be hereinafter described. In a similar manner, the master control rod portions are reconnected following automatic shut-off from Rewind by moving switch 43 and cam 78 until follower 77 engages the Off detent intermediate the Rewind detent and either the Record or Listen detent depending upon which of the latter operations is next to be undertaken. The same movements of the rear segment 75a of the master control rod break the motor switch contacts as hereinbefore described and the motor is caused to stop.

Since it is necessary after automatic shut-off to disengage finger 205 from slot 206 in the hub flange before the recorder can again be operated a reset button 208 is provided outside upper casing 31, Figs. 1 and 20. Reset button 208 is integral with a plunger 216 supported horizontally between casing 31 and bracket 186 and is secured to the rear end of shut-off arm 204 by screw 209. Fig. 20 shows the position of reset button 208 after it has been projected outwardly from its seat 217 by reason of finger 205 of shut-off arm 204 having fallen into slot 206. By depressing reset button 208 after automatic shut-off, arm 204 is pivoted counterclockwise, Fig. 20, and finger 205 is withdrawn from slot 206. This permits pin 212 to move outwardly whereupon the resilient trip spring 211 also moves outwardly to allow pin 210 thereon to again engage the aligned aperture 276 in the rear segment 75a of the master control rod.

To prevent finger 205 from again falling into slot 206 after resetting without manually rotating indicator card 46 relative to gear 181 which would destroy accurate indicating relationship between card 46 and any point on medium 99, a trip preventing arm 201 is pivotally mounted upon hub 174 between hub flange 183 and retaining spring 176. Spring 203 (Fig. 22) secured between the central portion of disc 183 and the outer portion of trip preventing arm 201, serves to hold arm 201 during normal operation adjacent slot 206 in hub flange 183. An upwardly extending lip 202 on the trip preventing arm covers slot 206 and prevents finger 205 from again dropping into the slot after resetting, spring 203 acting to bring this about when the Reset button is depressed. Upon completion of a run of medium 99, lip 202 contacts finger 205 and as disc 183 continues to rotate, finger 205 deflects lip 202 away from slot 206 whereupon finger 205 drops into the slot as hereinbefore described.

When the recorder is being shut off manually intermediate of a complete recording run by means of master control switch 43, the brakes are applied to the spools as hereinbefore described and the braking mechanism is actuated sufficiently fast to prevent running unused portions of the recording medium. Since the spools are rotating relatively slowly during recording (in comparison to rewinding), their momentum is almost instantaneously dissipated as soon as the brakes are applied. During rewinding, however, the spools are rotating several (perhaps seven) times as fast as during recording and consequently have considerably greater momentum which must be overcome rapidly by braking. Moreover rewinding is usually undertaken intermediate of a complete run in order ot return, after recording, for example, to a point along the medium where it is desired to commence listening. In order that the spools do not coast or slip past the desired point and in order to prevent the spools from overwinding and "throwing wire" with resultant tangling, it is necessary that the braking mechanism be actuated upon manual shut-off from Rewind more quickly than from Record. Since there is a time lag between the initial movement of master control switch 43 and the completion thereof when an Off detent is reached to apply the brakes, auxiliary brake activating means is provided to actuate the braking mechanism prior to completion of the movement of the master control switch.

To accomplish the foregoing, spring 211 is provided with an inwardly extending arm 269 having an upwardly extending finger 284 including a reduced upper portion 285, as shown in Figs. 21 and 31. A spring member 266 is secured at its rear end to the right side 286 of "B" battery compartment 37 and extends generally forwardly and outwardly from side 286 as shown in Figs. 3, 19, and 31. The forward end of spring member 266 has a downward projection 267, Figs. 19 and 31. An arm 268 having an upwardly extending finger 287 (Figs. 19 and 31) is also secured to the right side of the "B" battery compartment so as to receive spring member 266, finger 287 serving to limit the outward deflection of spring member 266 away from the "B" battery compartment. When the master control switch is moved from Rewind to either Off position both portions of the master control rod are cammed rearwardly, and arm 269 on spring member 211 is moved rearwardly from its position during rewinding (shown in solid lines in Fig. 31). When the upper portion 285 of finger 284 contacts the projection 267 on spring 266, arm 269 is cammed inwardly by the projection until it passes inwardly and rearwardly thereof. As this inward movement of arm 269 takes place, spring 211 is moved inwardly sufficiently to disengage finger 210 from aperture 276 in the rear portion of the master control rod. This disengagement, as hereinbefore described, permits the brake mechanism to be actuated to stop the spools. The braking action takes effect by reason of the above described auxiliary brake actuating means faster than would be otherwise possible by rearwardly camming the rear portion of the master control rod solely by means of the switch 43. Hence the spools do not have a chance to overrun.

As the rotation of switch 43 is completed to an Off position, finger 210 on spring 211 continues to move rearwardly until it again becomes aligned and received by aperture 276 as hereinbefore described. Since arm 269 is positioned forwardly of projection 267 only during rewinding, spring 266 is made sufficiently resilient in order that it may be deflected inwardly by finger 235 to allow arm 269 to pass outwardly thereby and forwardly thereof when the arm is moved forwardly into its rewinding position from other positions (such as its Off position shown in Figs. 14 and 20, and shown dotted in Fig. 31).

An amplifier 218, for augmenting the signal during recording and playback, is mounted in compartment 34 immediately forwardly of "B" battery compartment 37 and to the right of "A" battery compartment 38. The amplifier, comprising tubes 219, 220 and 221, and other components, is mounted upon a panel 222 and may incorporate a "printed circuit" (not shown) for providing necessary electrical connections. Panel 222 is mounted upon a supporting bracket 225 and is separated therefrom by rubber spacers 224, a pair of rubber bands 289 being used to secure frame 222 to bracket 225, as shown in Figs. 23 and 24. The ends of the rubber bands are threaded as shown, first through holes 291 in panel 222, through aligned holes in rubber spacers 224 and bracket 225, and are then hooked over nibs 290 on bracket 225. By thus mounting the amplifier, it is insulated from and its operation is substantially unaffected by any normal vibrations attributable to the recorder or its surroundings.

Arranged as part of the cam 78 is a pin 227 disposed to engage a block 226 which forms a part of the switch springs of switch mechanism 228. Switch mechanism 228 may comprise a series of leaf springs with contacts at their ends to which conductors (not shown) may be connected for completing electrical circuits to the amplifier tubes.

The recorder contains its own power supply in the form of "dry" batteries. As shown in Fig. 3, "A" battery compartment 38 contains two size "D" 1½ volt dry cells connected in series to drive motor 49 and energize the amplifier tube filaments. "B" battery compartment 37, Figs. 3 and 4, contains two "Minimax" 22½ volt "B" batteries connected in series to supply 45 volts of plate voltage for the amplifier tubes. The "B" batteries are supported in a T-shaped cradle 293 (Fig. 4) having a handle or eye 294 whereby the cradle and batteries may be readily removed from compartment 37. The "A" cells are 1 5/16 inches in diameter and 2 3/8 inches long, and the "B" batteries measure 3 1/32 by 1 5/16 by 2 3/16 inches. Appropriate electrical conductors are provided throughout the recorder, as required.

Referring to Fig. 1, it is seen that master control switch 43 has five positions indicated (counterclockwise): Record, Off, Rewind, Off, and Listen. These positions represent correspondingly indicated positions on cam surface 78, as shown in Fig. 15, and as developed in Fig. 16. An Off position is provided adjacent each operating position for operator convenience and logical operating sequence. When the operator is dictating or recording, he is usually only concerned with the two positions Record and Off. When transcribing from wire medium 99 to a typewritten form, for example, he is usually only concerned with the Listen and Off positions. Hence the arrangement of cam surface 78 is such that it is unnecessary to go through the Rewind position in order to switch between Record and Off, or between Listen and Off. Moreover, Rewind is logically situated centrally since it is necessary to rewind medium 99 before switching to Listen in order to play back after recording. It is likewise necessary to rewind after erasing before recording further. Since there is never an occasion to switch directly from Record to Listen, or vice versa, a shoulder 292 (Figs. 15 and 16) is provided on the cam between these positions to prevent switching therebetween.

The arrangement of positions of master control switch 43 and cam surface 78 further provides for the proper mechanical switching of electrical circuits for each desired operation of the recorder. In Rewind position, for example, as hereinbefore described, the filaments of the amplifier tubes are not energized, thereby eliminating the "Donald Duck" sound of reversed speech.

To prevent whipping of the recording medium during recording or listening when the spools are rotating relatively slowly and to provide for uniform coiling of the medium onto the record spool, so as to eliminate "wows," sufficient tension is maintained on the wire medium by reason of the drag caused by the frictional engagement of felt strip 295 on rewind spool spacer 123 with the cooperating surface of hub 125. As hereinbefore described, by reason of the direction of coiling of the felt strip 295, this drag is effected uni-directionally on the rewind spool, that is, the drag is effected on the rewind spool only when it is rotating in the direction for recording or listening. During rewinding, when the spools are rotating in the opposite direction and approximately seven times as fast as during recording or listening, the speed of the wire medium is sufficient to prevent whipping and non-uniform coiling onto the rewind spool, and, consequently, a similar drag producing structure is neither required nor provided on the record spool spacer 124.

With the parts of the recorder arranged as described and in the Off position with suitable batteries, wire, and an indicator card in place, the operation of the device may be visualized in connection with the description of the operation of specific parts already given as follows, it being assumed that the device has no recording thereon.

Proceeding to record, a microphone (not shown) is plugged into hole 45, the erase switch is placed at Off and the control switch 43 is turned from the Off position shown to Record position. Movement of the control switch to Record position, moves control rod 75 rearwardly through cam 78 and also moves pin 227 to effect movement of appropriate ones of switch members 228 whereby the tubes of the amplifier are energized and connected to the recording head. The tubes of the amplifier may be of the incandescent filament type whereby there is no delay in waiting for the amplifier to warm up. Movement of control rod 75 rearwardly removes the brakes from the reels by causing arm 72 to be cammed downwardly, effects energization of the motor by camming contacts 301 together; and effects driving engagement between the motor and Record spool 63 by causing engagement of motor roller 64 with countershaft roller 59 and engagement of countershaft roller 58 with roller 67. Accordingly, the wire medium moves, and speaking into the microphone causes recording of the speech thereon and the cue card 46 moves to indicate the amount of wire used.

To stop recording, the switch 43 is turned counterclockwise to Off position, whereupon control bar 75 is moved forwardly. This permits arm 72 to pivot upwardly along surface 281, whereupon the brakes are set, permits contacts 301 to separate, whereupon the drive motor is de-energized and the various driving rollers are separated from each other. Also, the pin 227 moves clockwise so as to cause the switch mechanism to remove energization from the amplifier and disconnect the recording head.

From the preceding stop position continued counterclockwise movement of switch 43 to rewind position moves control rod 75 forwardly. This movement effects release of the brakes by camming arm 72 downwardly; effects energization of the motor to run in the same direction as before by camming contacts 301 closed; and effects driving engagement of the motor and the rewind spool 62 by causing engagement of motor roller 64 with countershaft roller 59 and by engagement of the latter with roller 66. Pin 227 remains out of engagement with block 226 so that the amplifier remains unenergized.

Movement of switch 43 counterclockwise toward Off position from Rewind moves control bar 75 rearwardly. This effects disengagement of forward and rearward portions of the control rod by effecting removal of finger 210 from aperture 276. Spring 200 urges arm 72 upwardly which cams rear portion 75a rearwardly very rapidly thereby effecting setting of the brakes and disengagement of the driving rollers. Completion of the movement of switch 43 to Off position causes the forward portion 75b to re-engage the rearward portion 75a.

Movement of switch 43 from Off to Listen moves the complete control rod 75 rearwardly. This movement effects release of the brakes by arm 72; effects energization of the motor; and effects driving engagement of the motor and record spool 63, each as already described in connection with the recording function. This movement causes pin 227 to move clockwise for causing switch mechanism 228 to energize the amplifier and connect the head thereto.

After listening, the switch is moved clockwise to Off position, whereupon the brakes are set, the motor is de-energized and disconnected from the Record spools and the amplifier is disengaged as already described.

During rewinding, previously recorded material is erased by moving erase switch to On position.

The amplifier 218 is of the very high gain variety, which necessitates adequate shielding of the head and the motor to prevent recording of various types of noise or interference. Judicious placing of leads etc. must also be done.

It is thus apparent from the foregoing description that there has been provided a pocket-size magnetic recorder sufficiently small as to be carried in an overcoat pocket. According to the invention, a pocket-size recorder has been provided in which the components cooperate to produce a structure which is not "position sensitive," in which "wows" due to various causes have been eliminated, in which the cartridge and the wire medium may be completely removed from the recorder without handling of the wire and possible contamination thereof by the operator, in which improved braking action is obtained, and in which improved operation is effected. These means and mechanisms, including a self-contained power supply, are all uniquely and operatively arranged in the pocket-size recorder which has a girth of no more than eleven inches and which weights no more than 2½ pounds.

While one particular embodiment of this invention is above disclosed, it will be understood, of course, that the invention is not limited thereto, since many modifications may be made, and it is contemplated, therefore, by the appended claims, to cover any such modifications as fall within the true spirit and scope of this invention.

I claim:

1. In a pocket-size magnetic recording and reproducing device, means for moving an elongated medium to record and reproduce comprising a motor assembly and countershaft assembly each pivotally mounted between two points defining lines, respectively, which pass approximately through the centers of gravity of said motor assembly and said countershaft assembly so that said assemblies are nonsensitive to change in position.

2. In a pocket-size magnetic recording and reproducing device, means for moving an elongated medium to record and reproduce comprising a yoke-frame for supporting a motor assembly and a countershaft assembly, said assemblies each being pivotally mounted upon said yoke-frame so that the two points of support of each of said assemblies define lines passing approximately through the respective centers of gravity of said assemblies so that said assemblies are nonsensitive to change in position.

3. In a pocket-size magnetic recording and reproducing device, means for guiding an elongated recording medium along a path adjacent a magnetic head disposed in a cartridge comprising a driving roller member, a first driven roller member adapted to be operatively rotated by said driving roller member, a second driven roller member associated with said cartridge and adaptable when said cartridge is in place to engage said first driven roller member, and means for reciprocating said first driven roller member into and out of circumferential frictional driving engagement with said second driven roller member.

4. In a pocket-size magnetic recording and reproducing device, means for guiding an elongated recording medium along a path adjacent a magnetic head disposed in a cartridge comprising a driving roller member, a first driven roller member disposed adjacent said driving roller member, a second driven roller member associated with said cartridge and disposed adjacent said first driven roller member when said cartridge is disposed in place, said first driven roller member being separated at its circumference from said driving roller member and said second driven roller member by substantially no more than one-hundredth of an inch, and means for reciprocating said first driven roller member into and out of circumferential frictional driving engagement with said second driven member.

5. In a pocket-size magnetic recording and reproducing device, means for guiding an elongated recording medium along a path adjacent a magnetic head disposed in a cartridge comprising a driving roller member, a first pair of driven roller members one of which is adapted to engage said driving roller member, a second pair of driven roller members on said cartridge and disposed adjacent said first pair when said cartridge is disposed in place so that one of said first pair of roller members is adaptable to engage one of said second pair of roller members, and means for reciprocating one roller member of said first pair into and out of circumferential frictional driving engagement with one roller member of said second pair.

6. In a pocket-size magnetic recording and reproducing device, means for guiding an elongated recording medium along a path adjacent a magnetic head disposed in a cartridge comprising a driving roller member, a first pair of driven roller members mounted upon a common shaft, one roller member of said first pair being adapted to engage said driving roller member, a second pair of driven roller members coaxially mounted on said cartridge and each disposed when said cartridge is disposed in place adjacent a respective roller member of said first pair, and means for pivoting said shaft whereby each roller member of said first pair is urged alternately into and out of circumferential frictional driving engagement with the respective adjacent roller member of said second pair.

7. In a pocket-size magnetic recording and reproducing device, pivotal means for moving an elongated medium to record and reproduce comprising a driving assembly pivotally mounted between two points defining a line which passes through the center of gravity of said driving assembly, and control means operative on said pivotal means so that it is nonsensitive to change in position, said control means comprising a control element operable through a resilient member for pivoting said pivotal means.

8. In a pocket-size magnetic recording and reproducing device, pivotal means for moving an elongated medium to record and reproduce comprising a driving assembly pivotally mounted between two points defining a line which passes through the center of gravity of said driving assembly, and control means including a manually operated cam and control element actuated thereby engageable with said pivotal means through a resilient member for pivoting said pivotal means.

9. A pocket-size magnetic recording and reproducing device comprising a casing, cartridge means including spools for supporting a recording medium removable from said casing, means on said cartridge for guiding said medium from one spool to another, brake means on said cartridge means for stopping said spools, said brake means including a pair of individually pivoted brake shoes, a brake shaft, and an operating arm for said shaft, means internally of said casing and disengageably related to said cartridge for causing operation of said brake means, said internal means including a control rod having a cam surface engageable by said operating arm, spring means urging said operating arm into engagement with said cam surface, and control means operable externally of said casing to initiate operation of said internal means.

10. A pocket-size magnetic recording and reproducing device comprising a casing, cartridge means including spools for supporting a recording medium removable from said casing, means on said cartridge for guiding said medium from one spool to another, brake means on said cartridge means for stopping said spools, means internally of said casing and disengageably related to said cartridge for causing operation of said brake means, said brake means being cam actuated by said internal means, and control means operable externally of said casing to initiate operation of said internal means, said internal means comprising a control element engageable with said brake means and actuated by said control means.

11. A pocket-sized magnetic recording and reproducing device comprising, cartridge means including spools for supporting a recording medium, means on said cartridge for guiding said medium from one spool to another, brake means on said cartridge means for stopping said spools, means internally of said device for causing operation of said brake means, control means operable externally of said device to initiate operation of said internal means, said internal means comprising a control member having disengageable portions operatively related to said brake means and external means respectively and means for separating said portions whereby operation of said brake means is accelerated.

12. A pocket-size magnetic recording and reproducing device comprising cartridge means including spools for supporting a recording medium, means on said cartridge for guiding said medium from one spool to another, brake means on said cartridge means for stopping said spools, means internally of said device for causing operation of said brake means, control means operable externally of said device to initiate operation of said internal means, said internal means comprising a control member having disengageable portions operatively related to said brake means and external means respectively, means for separating said portions whereby operation of said brake means is accelerated, and means for re-engaging said portions when the operation of said brake means is completed.

13. A pocket-size magnetic recording and reproducing device comprising, cartridge means including spools for supporting a recording medium, means on said cartridge for guiding said medium from one spool to another, brake means on said cartridge means for stopping said spools, means for normally biasing said brake means into braking position, a control member having two disengageable portions, one of which includes a cam surface for moving said brake means out of braking position, control means operable externally of said device and engaging the other portion of said control member to initiate operation of said brake means, and means for separating said portions whereby said biasing means immediately effects operation of said brake means.

14. A pocket-size magnetic recording and reproducing device comprising, cartridge means including spools for supporting a recording medium, means on said cartridge for guiding said medium from one spool to another, brake means on said cartridge means for stopping said spools, means internally of said device for causing operation of said brake means, control means operable externally of said device to cause operation of said internal means, and means independent of said external control means automatically effective on approaching the end of the medium on either spool for causing operation of said brake means through said internal means.

15. A pocket-size magnetic recording and reproducing device comprising, cartridge means including spools for supporting a recording medium, means on said cartridge for guiding said medium from one spool to another, brake means on said cartridge means for stopping said spools, means internally of said device for causing operation of said brake means, control means operable externally of said device to cause operation of said internal means, and means independent of said external control means automatically effective on approaching the end of the medium on either spool for causing operation of said brake means.

References Cited in the file of this patent

UNITED STATES PATENTS

| | | |
|---|---|---|
| 773,985 | Ries | Nov. 1, 1904 |
| 1,237,496 | Frankhauser | Aug. 21, 1917 |
| 1,937,252 | Serra | Nov. 28, 1933 |
| 2,365,691 | Fodor | Dec. 26, 1944 |
| 2,369,017 | Camras | Feb. 6, 1945 |
| 2,441,679 | Wade | May 18, 1948 |
| 2,468,198 | Heller | Apr. 26, 1949 |
| 2,476,599 | Haloski | July 19, 1949 |
| 2,484,552 | Camras | Oct. 11, 1949 |
| 2,499,895 | Walker | Mar. 7, 1950 |
| 2,535,497 | Jones | Dec. 26, 1950 |
| 2,568,601 | Anderson | Sept. 18, 1951 |
| 2,616,982 | Gray | Nov. 4, 1952 |

FOREIGN PATENTS

| | | |
|---|---|---|
| 297,327 | Great Britain | Dec. 17, 1929 |